CHROMINANCE CIRCUITRY FOR TELEVISION RECEIVERS

Filed June 6, 1967 2 Sheets-Sheet 1

INVENTOR.
WILLIAM K. HICKOK
BY
Robert E. Strauser
ATTORNEY

June 2, 1970 W. K. HICKOK 3,515,801

CHROMINANCE CIRCUITRY FOR TELEVISION RECEIVERS

Filed June 6, 1967 2 Sheets-Sheet 2

INVENTOR.
WILLIAM K. HICKOK
BY
Robert E. Strauser
ATTORNEY

United States Patent Office 3,515,801
Patented June 2, 1970

3,515,801
CHROMINANCE CIRCUITRY FOR TELEVISION RECEIVERS

William Kelsey Hickok, Williamsville, N.Y., assignor to Sylvania Electric Products Inc., a corporation of Delaware Filed June 6, 1967, Ser. No. 643,925
Int. Cl. H04n 9/48
U.S. Cl. 178—5.4 10 Claims

ABSTRACT OF THE DISCLOSURE

Automatic chrominance control (ACC) circuitry and color-killer circuitry for the chrominance channel of a color television receiver. The ACC circuit provides an output operative to effect forward automatic chrominance control of a first chroma amplifier in the chroma channel. The same output from the automatic chrominance control circuit is applied to the control electrode of the color-killer circuit. The color-killer circuit is connected in series with the DC path of a second chroma amplifier so that cutting off the color-killer circuit cuts off the second chroma amplifier. A special switching electron device is utilized to enhance the switching characteristics of the color-killer circuit.

Background of the invention

This invention relates generally to television receivers and more particularly to improved chrominance circuitry for color television receivers.

The color television standard adopted in the United States dictates that color television receivers be capable of receiving both monochrome and color broadcast signals. In a color broadcast signal, the composite video signal includes a chrominance component and a luminance component, the latter being comparable to a monochrome signal representing the brightness variations of the image. The chrominance component includes a subcarrier signal and its modulated sidebands, modulated in phase to represent hue, and amplitude modulated to represent color intensity. In addition the composite video signal includes horizontal and vertical synchronizing pulses and bursts of signals at the subcarrier frequency, hereafter called the color-burst signals. In transmission the subcarrier wave is suppressed, necessitating the regeneration of the subcarrier at the receiver to permit demodulation of the chrominance components. Therefore, the color-burst signals are utilized to control a reference oscillator in the receiver which is operative to provide the continuous wave signal for subcarrier regeneration and reinsertion.

In the color television receiver, after amplification and detection of the composite video signal, the luminance components of the signal are applied to a luminance channel and the chrominance components including the color-burst signals are applied to a chrominance channel for further signal processing. By using separate channels to process the luminance and chrominance signal components, the receiver is capable of reproducing monochrome and color signal broadcasts. The chrominance and luminance components of a color broadcast signal are processed through their respective channels and recombined at or before the picture tube to create the color image. For a monochrome broadcast, the signal information is processed through the luminance channel and applied to the picture tube to produce the black and white image. However, for monochrome reception on a color receiver it is necessary to disable the chrominance channel of the receiver to avoid spurious color in the picture which will result from noise or other sporadic signals in the chrominance channel, or from video signal frequency components falling within the color subcarrier channel. Such a disabling function is generally accomplished using color-killer circuitry which is operative in response to an absence of color signals to cut off one of the stages in the chrominance channel between the color-burst takeoff point and the color demodulation circuitry.

Ideally, the color-killer circuit functions as an on/off switch so that the chrominance channel is fully operative during the reception of color signals and is completely cut off when a monochrome broadcast is recieved. Generally, prior art color-killer circuits have not had the desired sharp switching characteristics with the result that receiver operation is degraded. For example, when low level color signals are received, it has been found that the color content of the reproduced image fluctuates and the color tends to fade out. This condition results because the color-killer circuit is causing the amplifier stage to act as a gain-reducing amplifier operating in the region between cut-off and full conduction, that is, the switching characteristics of the circuit are not sufficiently sharp. To overcome this condition, the color-killer switching point may be changed, but while this improves low level color signal reception, it degrades monochrome signal reception since the color-killer circuit and the chrominance channel become suseptible to random noise signals whih produce so-called color "snow" in the black and white picture.

In addition to the color-killer function and in conjunction with amplification of the color signal components, the chrominance channel preferably provides an automatic gain control of the color signal to compensate for variations between the luminance and chrominance signal components. Such a control compensates for variations in luminance and chrominance signal strengths as broadcast by different transmitting stations. This also compensates for different signal strengths which may result from frequency selective attenuation effects in the path between transmitter and receiver or from minor misadjustment in the tuning of the receiver. The color automatic gain control, often referred to as automatic chrominance control (ACC), may be operative in response to the amplitude or the phase of the received color-burst signal to provide a controlled signal output from one or more of the chrominance amplifiers. In general the ACC signal and the color-killer signal are derived from a single detector circuit, but if these control circuits require opposite polarity of control signals, the detector output must go through a separate amplifier stage before being applied to one of the circuits.

Accordingly, it is an object of this invention to provide improved chrominance circuitry for color television receivers.

A further object of this invention is to provide improved chrominance control circuitry of simplified design and more reliable operation.

A more specific object of this invention is to provide automatic chrominance control and color-killer circuitry which are adapted to be controlled by signals of the same polarity derived from a color-burst signal component.

Still another object of this invention is to provide improved color-killer circuitry having sharp switching characteristics and increased noise immunity.

Summary of the invention

According to one aspect of the invention, a detector circuit has an output which varies in amplitude with the amplitude of the color-burst signal component. The signal from the detector is applied to an amplifier stage, the output of which is connected to the control electrode of a chroma amplifier to effect automatic chrominance control and also connected to the control electrode of the color-killer circuit. The color-killer circuit is connected in series with the direct-current path of a second chroma amplifier, such that when the color-killer is conducting, the second chroma amplifier functions normally, but when the color-killer is nonconducting, the direct-current path of the chroma amplifier is broken and the amplifier is cut-off.

Description of the preferred embodiments

For a better understanding of the present invention, together with other and further objects, advantages, and capabilities thereof, reference is made to the following disclosure and appended claims in connection with the above-described drawings.

Figure 1:
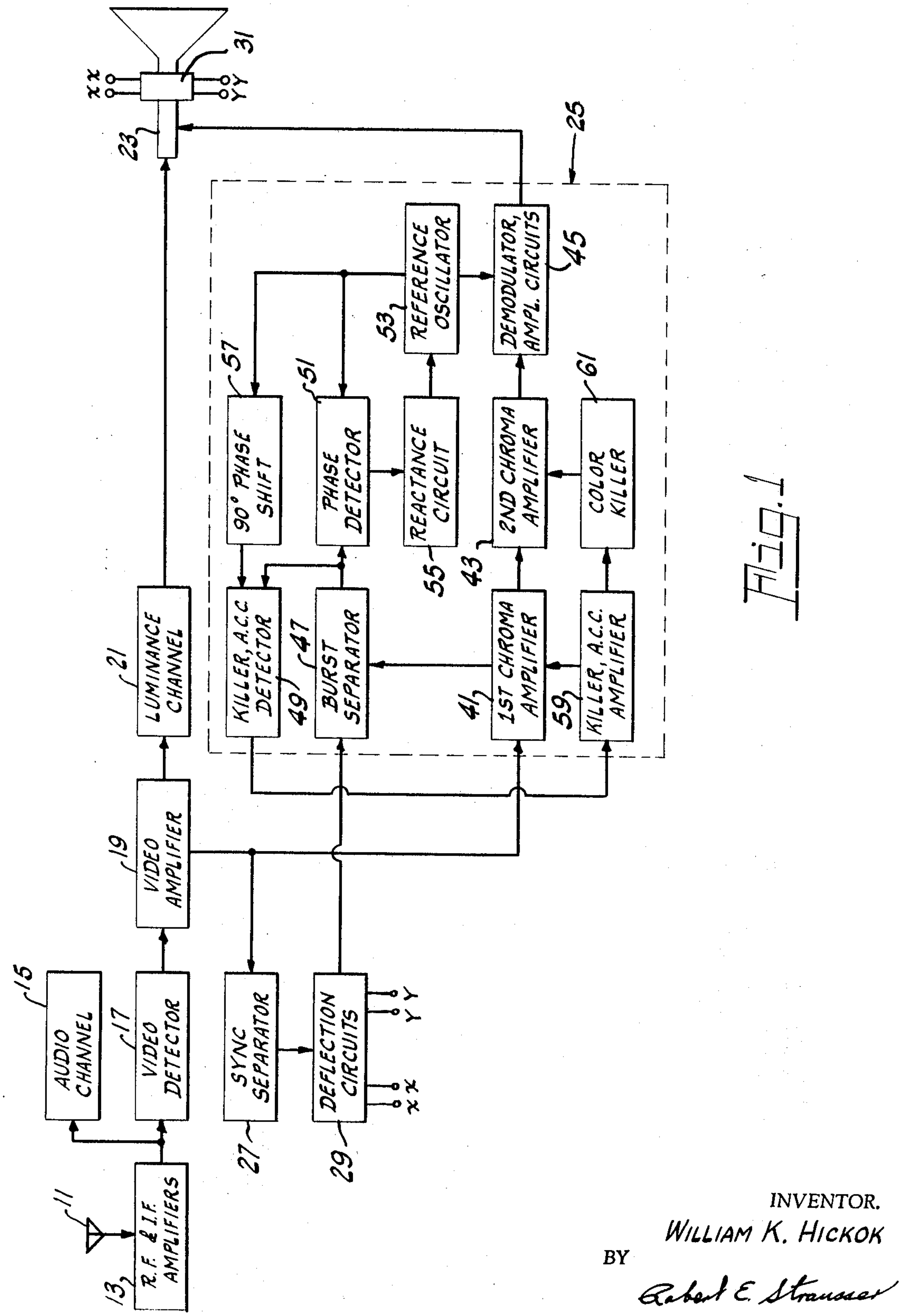
FIG. 1 is a block diagram of a color television receiver embodying the present invention.

As shown in FIG. 1, the composite color signal received at the antenna 11 is applied to the RF/IF amplifier 13. Following the IF amplifier, the audio signal components are separated and applied to the audio channel 15, and the composite video signal components after detection by a video detector 17 are applied to a video amplifier 19. At the video amplifier the luminance components are separated from the composite video signal and are coupled to a luminance channel 21, the output of which is applied to the cathode ray tube 23.

The remainder of the composite video signal is applied to the chrominance section 25 and a sync separator circuit 27. The sync circuitry separates the deflection synchronizing pulses from the composite signal and applies these pulses to suitable deflection circuitry 29. The deflection circuits develop horizontal and vertical deflection signals, X and Y, which are applied to a deflection yoke 31 mounted on the cathode ray tube 23 to accomplish the horizontal and vertical scanning functions necessary for image reproduction.

The input to the chrominance section 25 of the receiver includes the chroma signal components and the color-burst signal which are applied to a first chroma amplifier 41. One output from the amplifier 41 is applied to a second chroma amplifier 43 the output of which is connected to demodulator and amplifier circuitry 45. Another output from the first chroma amplifier is fed to a burst separator circuit 47. The burst separator has a control input from the deflection circuits 29, which activates the circuit during the time the color-burst signal is present. The output of the burst separator 47 is applied to a killer-ACC detector 49 and a phase detector 51. The phase detector also has an input from a subcarrier reference oscillator 53 and compares the phase of the oscillator with the phase of the color-burst signals, applying correction signals, if necessary, to a reactance circuit 55 which is operative to keep the reference oscillator locked in phase with the color-burst signals. An output of the reference oscillator 53 goes to the demodulator amplifier circuits 45, thereby permitting demodulation of the chroma signals yielding color information signals which are applied to the cathode ray tube 23 to suitably combine with the luminance signal for reproduction of the color image.

Another output from the reference oscillator 53 passes through a phase shifting network 57 and is applied to the killer-ACC detector 49. The detector 49 provides an output which is proportional to the amplitude of the color-burst signals which is applied to a killer-ACC amplifier 59. One output of the amplifier 59 is applied to the first chroma amplifier 41 to accomplish the automatic chrominance control function. Another output from the amplifier is connected to the color-killer circuit 61, which is in turn connected in series with the direct current path of the second chroma amplifier 43.

Figure 2:
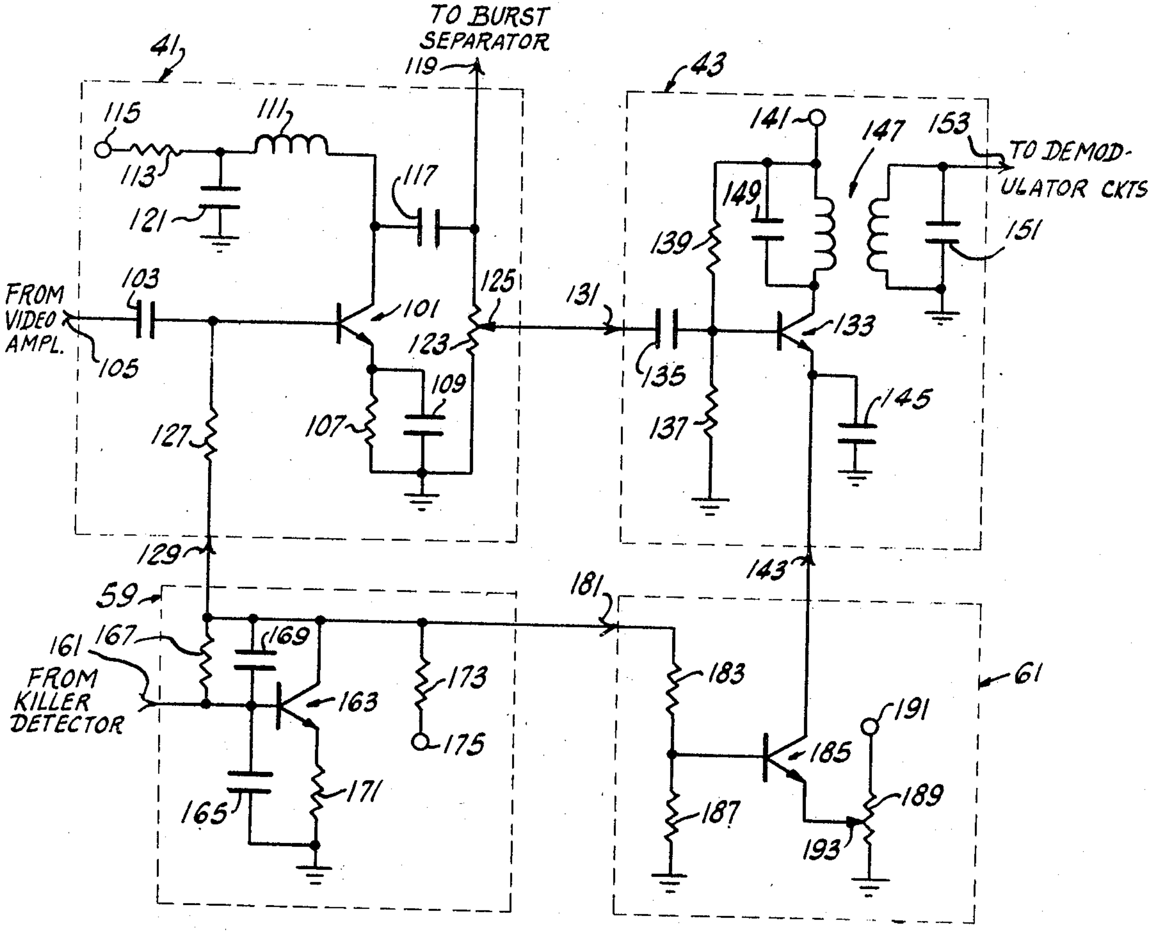
FIG. 2 is a schematic circuit diagram of a portion of the chrominance circuitry of a color television receiver according to the invention.

Referring next to FIG. 2, there is illustrated in schematic circuit diagram form the first and second chroma amplifiers 41 and 43, the killer-ACC amplifier 59, and the color-killer circuit 61. The first chroma amplifier includes an electron device such as a transistor 101 whose base electrode is connected via a capacitor 103 to the input 105 from the video amplifier 19, and whose emitter electrode is connected via a resistor 107 in parallel with a capacitor 109 to a point of reference potential. The collector electrode of the transistor 101 is connected in series with a coil 111 and a resistor 113 to a source of energizing potential as represented by the terminal 115, and is also connected via a capacitor 117 to an output terminal 119 going to the burst separator circuit 47. A capacitor 121 is connected between a point of reference potential and the junction of the coil 111 and the resistor 113. A potentiometer 123 is connected between terminal 119 and a point of reference potential with the center tap 125 of the potentiometer connected to the input terminal 131 of the second chroma amplifier 43. A resistor 127 is connected between the base electrode of the transistor 101 and an input terminal 129 from the killer-ACC amplifier 59.

The second chroma amplifier comprises an electron device such as a transistor 133 having its base electrode connected via a capacitor 135 to input terminal 131, via a resistor 137 to a point of reference potential and via another resistor 139 to a source of energizing potential as represented by the terminal 141. The emitter of the transistor 133 is connected directly to an input terminal 143 from the color-killer circuit 61 and is connected by means of a capacitor 145 to a point of reference potential. The primary winding of a transformer 147 is connected in parallel with a capacitor 149 between the source of energizing potential 141 and the collector electrode of transistor 133. The secondary winding of the transformer 147 is connected in parallel with a capacitor 151 between a point of reference potential and an output terminal 153 going to the demodulator, amplifier circuits 45.

The killer-ACC amplifier 59 receives an input 161 from the killer-ACC detector 49, which is applied directly to the base electrode of an electron device such as a transistor 163. The base electrode is connected to ground via a capacitor 165, and is connected to the collector electrode via a parallel resistor 167, capacitor 169 network. A resistor 171 connects the emitter electrode of the transistor 163 to ground and a resistor 173 connects the collector electrode to a source of energizing potential as represented by terminal 175. The collector electrode of the transistor 163 is connected directly to the input terminal 129 of the first chroma amplifier and to an input terminal 181 of the color-killer circuit 61.

The input 181 of the color-killer circuit is connected via a resistor 183 to the base electrode of an electron device such as a transistor 185 with the base electrode also connected to a point of reference potential by means of a resistor 187. The collector electrode of the transistor 185 is connected directly to the input terminal 143 of the second chroma amplifier 43. A potentiometer 189, connected between a source of bias potential as represented by terminal 191 and a point of reference potential, has a center-tap 193 connected to the emitter electrode of the transistor 185.

When the circuits of FIG. 2 are used with the receiver of FIG. 1, it is required that the killer-ACC detector provide a signal input 161 to the killer-ACC amplifier which is a maximum positive DC potential during the reception of monochrome broadcast signal and is minimally positive during the reception of maximum strength color broadcast signals. The killer-ACC amplifier 59 operates essentially as a linear DC amplifier over the range of DC potentials from the killer-ACC 49. When the potential at the input 161 is minimal, the transistor 163 collector-to-emitter current is low, and the collector potential is maximum. When the signal input is maximum the transistor 163 conducts heavily and the collector potential is minimal. The collector potential is applied to the input terminal 129 of the first chroma amplifier and to the input terminal 181 of the color-killer 61.

The first chroma amplifier 41 receives the chroma input signal from the video amplifier 19 and the automatic chrominance control input at terminal 129 from the killer-ACC amplifier 59. The first chroma amplifier operates to amplify the signal input the video amplifier and provides output signals at terminal 119 to the burst separator 47 and terminal 131 to the second chroma amplifier 43. The first chroma amplifier operates as a linear amplifier utilizing what is commonly termed forward automatic gain control. Thus when the DC input to termnial 129 is maximum, the gain of the transistor 101 is minimum, and when the DC input is nominal the transistor gain is maximum The potentiometer 123 connected across the output of the amplifier provides a means for varying the amount of chroma signal which is applied to the input of the second chroma amplifier 43.

The input of the color-killer circuit 61 is developed across a resistive divider consisting of resistors 183 and 187 with the junction of the two resistors connected to the base of the transistor 185. This transistor is a switching transistor which goes from a cut-off condition to a condition of maximum conduction with only a small change in the base-to-emitter potential. The potentiometer 189 connected in the emitter circuit provides means for varying the point at which the transistor switches, that is, by utilizing a positive source of bias potential 191 and adjusting the center arm 193 to increase the potential at the emitter of the transistor 185, a higher base potential is required to switch the transistor from cut-off to full conduction.

As shown in FIG. 2, the collector electrode of the color-killer transistor 185 is connected in series with the emitter electrode of the transistor 133 of the second chroma amplifier 43. Except for the connection of the emitter electrode, the second chroma amplifier 43 is a conventional linear amplifier which amplifies the chroma signal input at terminal 131 from the first chroma amplifier 41 and provides an amplified output, transformer coupled from the collector to terminal 153 going to the demodulator circuits 45. The emitter electrode of the transistor 133 is at signal ground by virtue of the capacitor 145 connected between the emitter and ground. The second chroma amplifier operates in normal fashion as a linear amplifier as long as the color-killer transistor 185 is conducting. In the absence of a color signal, the transistor 185 is cut-off, breaking the DC path to the emitter electrode of the transistor 133 in the second chroma amplifier 43 thereby cutting this stage off also. However, since the switching on and off of the second chroma amplifier is accomplished by the switching of the color-killer transistor 185, the second chroma amplifier transistor 133 is not required to have special switching characteristics and conversely, the color-killer transistor is not required to have any particular amplification or bandwidth characteristics.

Figure 3:
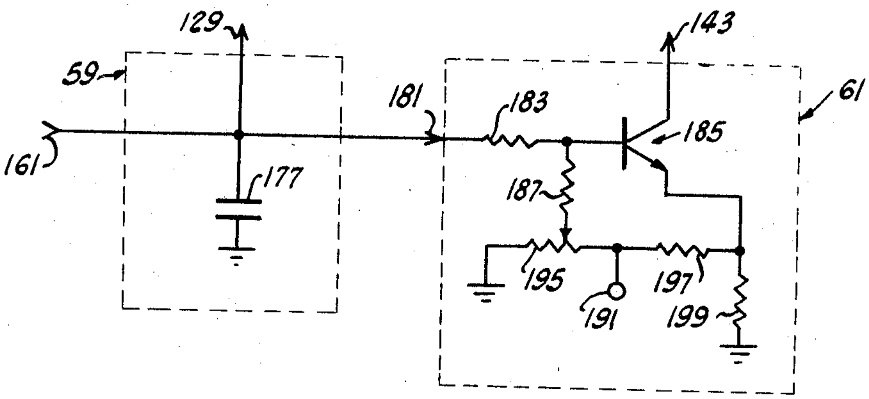
FIG. 3 is a schematic circuit diagram of an alternate embodiment of the color-killer circuit of FIG. 2.

An alternate embodiment of the invention is shown in FIG. 3. In this configuration the killer-ACC amplifier 59 consists solely of a capacitor 177 connected between the input terminal 161 and ground. The input terminal 161 is connected directly to input terminal 129 of the first chroma amplifier 41 and to the input terminal 181 of the color-killer stage 61. This configuration may be used when the killer-ACC detector provides a signal which is a minimum DC potential during the reception of a monochrome broadcast signal and increases to a maximum for the reception of maximum strength color broadcast signals. In addition the killer-ACC detector must provide a signal of sufficient magnitude to obviate the need of signal amplification.

The color-killer circuit 61 of FIG. 3 illustrates one manner in which the switching point of the transistor 185 can be changed by varying the potential at the base electrode of the transistor. In this embodiment, the base electrode of the transistor 185 is connected via a resistor 183 to the input terminal 181 and via another resistor 187 to the center tap of a potentiometer 195 which is connected between ground and the source of bias potential 191. A series resistive divider network is connected between the source of bias potential 191 and ground with the junction of the two resistors connected directly to the emitter electrode of the transistor 185. The collector electrode is again connected to the input terminal 143 of the second chroma amplifier 43.

Functionally, the color-killer circuit of FIG. 3 operates in the same manner as the color-killer circuit of FIG. 2, conducting whenever minimal color broadcast signals are received and non-conducting when monochrome broadcast signals are received. However, with this embodiment the DC potential applied to the emitter electrode of the transistor 185 is fixed by the resistive divider network consisting of the resistors 197 and 199 connected between the source 191 and ground with the emitter connected to the junction of the two resistors. The base-to-emitter bias is varied by adjusting the potentiometer 195, the center tap of which is connected via the resistor 187 to the base electrode of the transistor.

From the foregoing it can be appreciated that the present invention provides improved chrominance circuitry having significant advantages over the prior art. By using color-killer circuitry which is connected in series with a chroma amplifier, the chroma amplifier may be designed without imposing stringent switching characteristics on its operation and conversely the color-killer circuit need satisfy only switching parameters without regard to linear amplifier characteristics. This, of course, simplifies the design and cost of the respective circuits and provides more reliable circuit and set operation with the desired improved switching characteristics. In addition by using forward automatic chroma control on the first chroma amplifier, the ACC and color-killer functions are accomplished using a single control signal. With the suggested embodiment, the first chroma amplifier operates independently of the second chroma amplifier such that even when the second chroma amplifier is cut-off, the first chroma amplifier remains active. Thus, when a color signal is again received, the first chroma amplifier readily processes the signals to provide immediate reactivation of the chorma channel.

It will be readily apparent to those skilled in the art that the embodiments of the present invention shown in FIGS. 2 and 3 are subject to numerous modifications and changes, which may be dictated, for example, by system requirements or design preference. The invention has been described as utilizing transistor amplifiers but obviously they could be replaced by other electron devices, such as tubes, which have the appropriate amplification and transfer characteristics. While the first chroma amplifier has been described as using forward automatic chroma control at the base electrode, the ACC could be accomplished using other well known techniques such as having the ACC voltage applied to the emitter electrode of the transistor amplifier. In some instances it may not be necessary to provide means for varying the bias of the color-killer transistor in which case the emitter electrode of this transistor might be connected directly to ground.

I claim:

1. In a television receiver adapted to receive either color or monochrome signal broadcasts, which includes a luminance channel and a chrominance channel, wherein the chrominance channel includes detector circuitry for generating signals indicating the presence or absence of color signals, and further includes circuitry for processing color information signals, improved chrominance chanel circuitry comprising:

a chroma amplifier having first and second input terminals and at least one output terminal, an electron device having first, second and third electrodes, and means connecting the first, second and third electrodes of said electron device to said first and second input terminals and said output terminal, respectively;

a color-killer circuit including an electron device having first, second and third electrodes;

means connecting the third electrode of said second electron device to the second input terminal of said chroma amplifier thereby connecting said first and second electron devices in series;

means for applying color information signals to the first input terminal of said chroma amplifier;

means connecting the output terminal of said chroma amplifier to said circuitry for processing color information signals; and means for applying the detector output signals to the first electrode of said second electron device, said signals being operative to render said second electron device non-conducting when no color signals are present and operative to render said second electron device conducting during the presence of color signals.

2. The invention according to claim 1 wherein said first and second electron devices each having first, second and third electrodes are transistors, each having base, emitter and collector electrodes, respectively.

3. In a television receiver adapted to receive either color or monochrome signal broadcasts, which includes a luminance channel and a chrominance channel, wherein the chrominance channel includes detector circuitry for generating signals indicating the presence or absence of color signals, and further includes circuitry for processing color information signals, improved chrominance channel circuitry comprising:

rst and second chroma amplifiers each having first and second input terminals and at least one output terminal, and means connecting the output terminal of said first chroma amplifier to the first input terminal of said second chroma amplifier;

means for applying color information signals to the first input terminal of said first chroma amplifier;

means connecting the output terminal of said second chroma amplifier to the circuitry for processing color information signals;

a color-killer circuit having input and output terminals;

means connecting the output terminal of said color-killer circuit to the second input terminal of said second chroma amplifier to thereby connect said second chroma amplifier in series with said color-killer circuit, whereby said second chroma amplifier is rendered non-conducting when said color-killer circuit is non-conducting; and means for applying the detector output signals to the input terminals of said color-killer circuit to thereby render said color-killer circuit conducting during the presence of color signals and to render said color-killer circuit non-conducting during the absence of color signals.

4. The invention according to claim 3 wherein the detector output signal during the presence of color signals varies in accordance with the amplitude of the color signal, additionally comprising means for applying the detector output signals to the second input terminal of said first chroma amplifier to thereby effect automatic chrominance control of the color signal.

5. The invention according to claim 3 wherein said color-killer circuit comprises:

an electron device having first, second and third electrodes;

means connecting the first electrode of said electron device to said input terminal; and means connecting the third electrode of said electron device to said output terminal.

6. The invention according to claim 5 wherein said color-killer circuit additionally comprises biasing means connected to the second electrode of said electron device, said biasing means being operative to control the point at which said electron device switches from a non-conducting to a conducting state.

7. The invention according to claim 3 wherein said second chroma amplifier comprises:

an electron device having first, second and third electrodes;

means connecting the first electrode of said electron device to said first input terminal;

means connecting the second electrode of said electron device to said second input terminal; and means coupling a signal from the third electrode of said electron device to said output terminal.

8. The invention according to claim 4 wherein said first chroma amplifier comprises:

an electron device having first, second and third electrodes;

means connecting the first electrode of said electron device to said first input terminal;

means connecting the first electrode of said electron device to said second input terminal; and means connecting the third electrode of said electron device to said output terminal.

9. The invention according to claim 8 wherein said means for applying the detector output signals to the input terminal comprises:

an amplifier including a second electron device having first, second and third electrodes;

means connecting the output of said detector to the first electrode of said second electron device; and means connecting the third electrode of said second electron device to the input terminal of said color-killer circuit.

10. The invention according to claim 9 wherein said means for applying the detector output signals to the second input terminal of said first chroma amplifier comprises a direct connection from the third electrode of said second electron device to the second input terminal of said first chroma amplifier.

References Cited

UNITED STATES PATENTS

| | | |
|---|---|---|
| 3,272,915 | 9/1966 | Theriault. |
| 3,308,231 | 3/1967 | Heuer. |
| 3,435,131 | 3/1969 | Krug. |

ROBERT L. GRIFFIN, Primary Examiner

R. MURRAY, Assistant Examiner